United States Patent
Saito et al.

(10) Patent No.: US 6,747,823 B2
(45) Date of Patent: Jun. 8, 2004

(54) METHOD OF DEMAGNETIZING AND TRANSFERRING MAGNETIZATION IN A MAGNETIC RECORDING MEDIUM, AND DEVICE THEREOF

(75) Inventors: Akira Saito, Nagano (JP); Kiminori Sato, Nagano (JP); Eiichi Yonezawa, Kanagawa (JP)

(73) Assignee: Fuji Electric Co., Ltd. (JP)

(*) Notice: Subject to any disclaimer, the term of this patent is extended or adjusted under 35 U.S.C. 154(b) by 255 days.

(21) Appl. No.: 10/033,181

(22) Filed: Oct. 23, 2001

(65) Prior Publication Data

US 2002/0101684 A1 Aug. 1, 2002

(30) Foreign Application Priority Data

Oct. 23, 2000 (JP) ........................................ 2000-323203

(51) Int. Cl.$^7$ ................................................. G11B 5/86
(52) U.S. Cl. ............................. 360/17; 360/66; 361/149
(58) Field of Search ........................... 360/15, 16, 17, 360/55, 57, 66, 135, 75; 361/149, 150, 151

(56) References Cited

U.S. PATENT DOCUMENTS

| | | | | |
|---|---|---|---|---|
| 3,869,711 A | | 3/1975 | Bernard et al. | |
| 4,423,460 A | * | 12/1983 | Jackson | 361/151 |
| 5,121,258 A | * | 6/1992 | Chi | 360/17 |
| 5,198,959 A | * | 3/1993 | Scholtysik | 361/149 |

FOREIGN PATENT DOCUMENTS

| JP | 10-40544 | 2/1998 |
|---|---|---|
| JP | 11-25455 | 1/1999 |

* cited by examiner

Primary Examiner—Alan T. Faber
(74) Attorney, Agent, or Firm—Rossi & Associates

(57) ABSTRACT

A method of controlling magnetic recording in a magnetic recording medium and a control device for the same provides a symmetrical transferred signal waveform of equal magnitude with good reproducibility and performs magnetic transfer with high reliability. In performing initial magnetization prior to performing transfer magnetization, an AC magnetic field, the polarity of which changes in the perpendicular direction Y (or both in the perpendicular direction Y and parallel direction X), is applied to the recording surface of the magnetic recording layer of a magnetic recording medium, and the intensity of the AC magnetic field is gradually decreased with time, to demagnetize the entire magnetic recording layer.

10 Claims, 18 Drawing Sheets

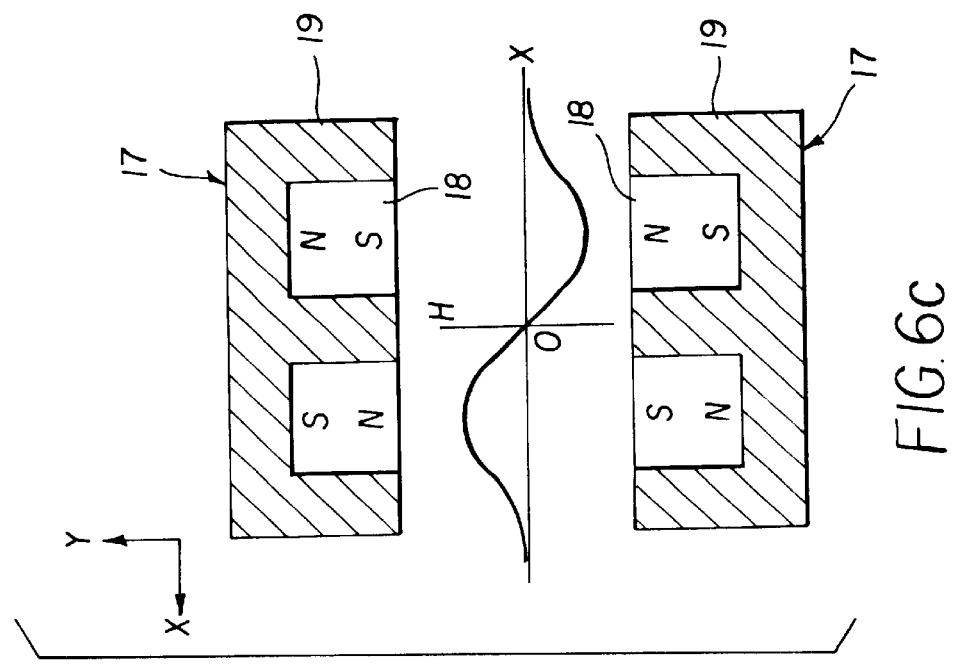
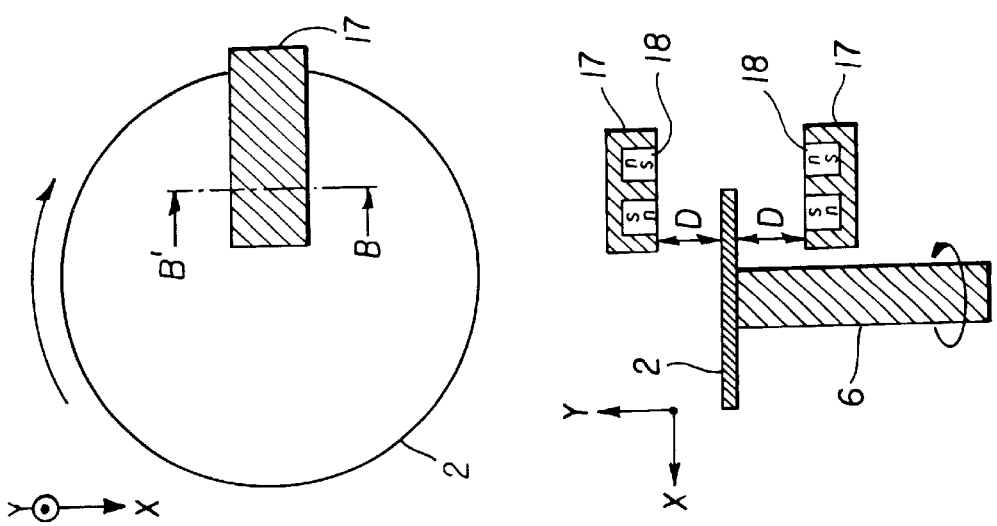
FIG. 6a
FIG. 6b
FIG. 6c

METHOD OF DEMAGNETIZING AND TRANSFERRING MAGNETIZATION IN A MAGNETIC RECORDING MEDIUM, AND DEVICE THEREOF

FIELD OF THE INVENTION

The invention relates to a method for controlling magnetic recording in a magnetic recording medium, and a control device for magnetic recording, which can be used in particular with magnetic transfer technology for recording magnetization in perpendicular to the recording surface of the magnetic recording medium (the so-called perpendicular magnetic recording medium).

BACKGROUND OF THE INVENTION

A first example of a conventional magnetic transfer technology will be explained with reference to FIG. 15(a) through FIG. 16(b), which explain the principle of magnetic transfer technology which performs magnetic transfer onto the recording surface of a magnetic recording medium. FIG. 15(a) is a cross-sectional view for explaining the initial magnetization of the so-called longitudinal magnetic recording medium, in which the magnetization thereof is parallel to the recording surface thereof. FIG. 15(b) is another cross-sectional view for explaining the transfer magnetization of the longitudinal magnetic recording medium.

As shown in FIG. 15(a), a magnetic recording disc 2 is positioned, as a longitudinal magnetic recording medium on a rotatable spindle stage 6. A ring head 3, including a magnet 3a and yokes 3b, is positioned at a position spaced apart for a distance Di in the upward direction from the recording surface of the magnetic recording disc 2. Further, a master disc 5 having a plurality of soft magnetic patterns 5a is placed above the recording surface of the magnetic recording disc 2. The ring head 3 generates a magnetic field in parallel to the circumferential direction of the magnetic recording disc 2 (that is, the parallel direction X). The direction of the magnetic field applied in the initial magnetization process and the direction of the magnetic field applied in the transfer magnetization process are opposite to each other.

For recording onto the longitudinal magnetic recording medium, first the magnetic recording medium is magnetized, as shown in FIG. 15(a), in one direction within the recording surface of the magnetic recording medium using the ring head 3 (initial magnetization). Then, as shown in FIG. 15(b), the ring head 3 is made to approach the magnetic recording disc 2 from the distance Di to the distance Dp, and a magnetic field, in the direction opposite the initial magnetization, is applied to the master disc 5 and magnetic recording disc 2, which are in close contact with each other.

The magnetic field generated by the ring head 3 cannot reverse the initial magnetization of the recording medium, since the magnetic field localizes to the soft magnetic patterns 5a with high magnetic permeability. However, the magnetic field generated by the ring head 3 causes a leakage magnetic field in the portions of the magnetic recording medium not facing to any soft magnetic layer, and the leakage magnetic field reverses the initial magnetization of the magnetic recording medium. In this way, the soft magnetic pattern 5a of the master disc 5 is recorded as a magnetization pattern, the direction thereof is opposite to the direction of the initial magnetization in the longitudinal direction (that is, the parallel direction X). Due to the principle explained above, it is necessary that the direction of the applied magnetic field applied in the initial magnetization process and the direction of the applied magnetic field applied in the transfer magnetization process for longitudinal magnetic recording media be opposite to each other.

FIG. 16(a) is a cross-sectional view for explaining the initial magnetization of the so-called perpendicular magnetic recording medium, in which the magnetization thereof is perpendicular to (in the perpendicular direction Y of) the recording surface thereof. FIG. 16(b) is another cross-sectional view for explaining the transfer magnetization of the perpendicular magnetic recording medium. In the method of magnetic transfer to the perpendicular magnetic recording media, the direction of the applied magnetic field merely changes from the foregoing parallel direction X to the perpendicular direction Y. The direction of the applied magnetic field applied in initial magnetization and the direction of the applied magnetic field applied in transfer magnetization are opposite to each other. Further, due to a principle similar to the principle of the method of magnetic transfer to the longitudinal magnetic recording medium, it is necessary that the directions of the applied magnetic fields applied in the initial magnetization process and in the transfer magnetization process be opposite to each other.

A second example of the conventional art is explained with reference to FIG. 17(a) through FIG. 18(b). FIG. 17(a) is a cross-sectional view for explaining the process of initial magnetization of the magnetic recording disc 2. FIG. 17(b) is another cross-sectional view for explaining the process of initial magnetization of the magnetic recording disc 2.

In FIG. 17(a), two single-pole heads (permanent magnets) 1 are aligned in perpendicular to (in the perpendicular direction Y of) the magnetic recording disc 2 and positioned symmetrically with respect to the magnetic recording disc 2. The magnetic recording disc 2, vacuum-chucked to the spindle stage 6, is inserted such that the surface of the magnetic recording disc 2, on which magnetic transfer is performed, coincides with the symmetry plane 0 spaced apart for an equal distance D from each of the magnetic poles of the two single-pole heads 1. The magnitude of the perpendicular component of the magnetic field created in the symmetry plane by the two single-pole heads 1 is several Oe, which is substantially small compared with the coercive force Hc of the magnetic recording media currently in use (around 3000 Oe). The distance D at this stage is from 5 to 10 cm.

In FIG. 17(b), the pair of single-pole heads 1 which are spaced apart from the magnetic recording medium for the distance D in FIG. 17(a) are made to approach the recording medium, while maintaining a symmetrical arrangement with respect to the symmetry plane at which the recording surface of the recording medium is positioned, until the distance to the recording medium is Di. Then, the entire surface of the magnetic recording disc 2 is magnetized in a single direction (perpendicular to the symmetry plane) by rotating the spindle stage 6. At this stage, the distance Di is from 2 mm to 3 mm, and the magnitude of the perpendicular component (perpendicular to the recording surface) of the magnetic field applied to the magnetic recording disc 2 is from 5000 to 6000 Oe.

FIG. 18(a) is a cross-sectional view for explaining the process of transfer magnetization of the magnetic recording medium 2. FIG. 18(b) is another cross-sectional view for explaining the process of transfer magnetization of the magnetic recording medium 2. In FIG. 18(a), the magnetic recording disc 2 vacuum-chucked to a spindle stage 6 is inserted between two ring heads 3, such that the surface, on which magnetic transfer is performed, of the magnetic recording disc 2 coincides with the symmetry plane 0 which is spaced apart for an equal distance D from the gaps of the two symmetrically positioned ring heads (permanent magnets) 3. Then, a master disc 5 is placed in close contact with the magnetic recording disc 2. At this stage, since the magnitude of the perpendicular component or of the parallel component of the magnetic field created at the symmetry plane by the two ring heads 3 is several Oe, which is small compared with the coercive force Hc of the magnetic recording media currently in use (around 3000 Oe), magnetic transfer is not conducted yet. The distance D at this stage is in the range between 5 and 10 cm like that shown in FIG. 17(a).

In FIG. 18(a), the pair of ring heads 3, spaced apart for the distance D from the magnetic recording medium, are made to approach the magnetic recording medium, while maintaining a symmetrical arrangement with respect to the symmetry plane at which the recording surface of the recording medium is positioned, until the distance to the recording medium is Dp. Then, the spindle stage 6 is rotated, resulting in magnetic transfer to the entire surface of the magnetic recording disc 2. The distance Dp at this stage is from 3 mm to 5 mm.

FIG. 19 and FIG. 20 show the magnetic field distribution in the surface of the magnetic recording medium immediately below the soft magnetic patterns 5a when a magnetic field is applied in the parallel direction X of the soft magnetic patterns 5a embedded in the master disc 5 using a ring head 3.

FIG. 19 shows the distribution of the parallel component of the magnetic field. The magnetic transfer to the longitudinal magnetic recording medium described with reference to FIG. 15(b), is performed utilizing the parallel component of the magnetic field in FIG. 19. In FIG. 19, the magnitude of the magnetic field is everywhere positive, and the parallel component is directed in only one direction. For this reason, the direction of the initial magnetization of the longitudinal magnetic recording media described above must be in the direction opposite the transfer magnetization.

However, a problem exists with respect to magnetization in the perpendicular direction Y. FIG. 20 shows the distribution of the perpendicular component of the magnetic field. Considering the distribution of the perpendicular component of the magnetic field with reference to FIG. 20, the direction of the perpendicular component has peaks in two directions, positive and negative, over one cycle of the soft magnetic pattern 5a. Hence this indicates that, even if the magnetic recording medium is not initially magnetized in advance in one direction (even if the medium is not magnetized in advance in a specific direction), the soft magnetic patterns 5a can be transferred.

FIG. 21 shows the waveform of the transferred signal 8 read out after performing only the transfer magnetization described with reference to FIGS. 18(a) and 18(b), without placing the recording medium in a particularly strong magnetic field after forming the recording layer of the magnetic recording medium by sputtering. The upward-directed transferred signal intensity Da and the downward-directed transferred signal intensity Db are equal, and it is seen that a symmetrical transferred signal 8 is obtained. That is, according to the transfer method described with reference to FIGS. 18(a) and 18(b), it is not necessary to initially magnetize the recording medium in advance in one direction.

On the other hand, FIG. 22 shows the transferred signal 8 transferred by the transfer magnetization described with reference to FIGS. 18(a) and 18(b) to the magnetic recording medium, first initialized by the initial magnetization process described with reference to FIGS. 17(a) and 17(b) such that the initial magnetization is perpendicular to the magnetic recording medium. As is seen from FIG. 22, the waveform of the transferred signal 8 is asymmetric, with the transferred signal intensities such that Da<Db. The reason that a waveform in which the transferred signal intensities Da and Db are equal is not obtained is considered in the following way. Since the magnetic recording medium is magnetized in one of the directions in advance by the initial magnetization of FIGS. 17(a) and 17(b), it is difficult to make the magnitudes of the recorded upward-directed magnetization and downward-directed magnetization equal, even if a magnetic field equal in magnitude and opposite in direction like that shown in FIG. 20 is applied in the transfer magnetization process of FIGS. 18(a) and 18(b). If the asymmetrical relation of the transferred signal intensities, Da<Db, in the transfer magnetization process is left unaltered, there is the problem that normal recording cannot be performed in the process of transfer magnetization.

In view of the foregoing, it would be desirable to provide a method for controlling magnetic recording in a magnetic recording medium, and a control device for magnetic recording, which are capable of obtaining a symmetrical transferred signal waveforms equal in magnitude with good reproducibility, and of performing magnetic transfer with high reliability.

SUMMARY OF THE INVENTION

According to an aspect of the invention, a method of controlling magnetic recording in a magnetic recording medium is provided, wherein the method includes initial magnetization prior to magnetically performing transfer magnetization on the magnetic recording layer of the magnetic recording medium; the method including: a step of demagnetizing; the step of demagnetizing including applying an alternating magnetic field, the polarity thereof changing, in perpendicular to or both in perpendicular and parallel to the recording surface of the magnetic recording layer; and decreasing the intensity of the alternating magnetic field gradually with elapse of time to demagnetize the entire magnetic recording layer.

Advantageously, the step of demagnetizing employs an electromagnet generating the alternating magnetic field, the polarity thereof changing with elapse of time in a predetermined position to demagnetize the entire magnetic recording layer.

Advantageously, the step of demagnetizing employs a magnetic head including a plurality of mutually separated permanent magnets embedded in a nonmagnetic base, the magnetic head generating an alternating magnetic field, the alternating magnetic field being constant in time, the polarity of the alternating magnetic field changing spatially to demagnetize the entire magnetic recording layer.

Advantageously, the alternating magnetic field is generated by moving the magnetic head in perpendicular to the recording surface of the magnetic recording medium.

Advantageously, the alternating magnetic field is generated by moving the magnetic head in a direction which traverses the magnetic recording medium, while the distance between the magnetic head and the recording surface of the magnetic recording medium is held constant.

Advantageously, the magnetic recording medium is a perpendicular magnetic medium having an easy axis of magnetization in the direction perpendicular to the recording surface. Advantageously, the direction of the magnetization recorded in the magnetic recording medium is perpendicular to the recording surface.

Advantageously, the magnitude of the applied alternating magnetic field first saturates, and then decreases with the polarity thereof changing sinusoidally with time as described by the following equation.

$$H(t)=A_0 g(t)\cos(2\pi f.t),$$

where t is the time, $A_0$ is the maximum applied magnetic field, and f is the frequency.

Advantageously, the method further includes a step of transfer magnetization performed after the step of demagnetizing, the step of transfer magnetization including preparing a master disc including a nonmagnetic substrate and soft magnetic layers of a soft magnetic material embedded in the nonmagnetic substrate such that the soft magnetic layers are isolated from each other and aligned periodically; positioning the master disc in close contact with or in close proximity to the recording surface of the magnetic recording layer of the magnetic recording medium; and applying a magnetic field in parallel to the recording surface in close contact with or in close proximity to the master disc to magnetically transferring the servo data stored in the master disc in the form of the soft magnetic patterns to the magnetic recording medium.

According to another aspect of the invention, there is provided a control device for controlling magnetic recording, the control device including: a demagnetization means and a transfer means; the demagnetization means applying an alternating magnetic field in perpendicular to or in perpendicular and parallel to the recording surface of the magnetic recording layer of a magnetic recording medium, the intensity of the alternating magnetic field decreasing with elapse of time to initially demagnetize the entire of the magnetic recording layer; the magnetic transfer means positioning a master disc in close contact with or in close proximity to the recording surface of the magnetic recording layer, the master disc including a nonmagnetic substrate and a plurality of soft magnetic layers of a soft magnetic material embedded in the nonmagnetic substrate such that the soft magnetic layers are isolated from each other and aligned periodically; and the magnetic transfer means applying a magnetic field in parallel to the recording surface of the magnetic recording layer to magnetically transfer the servo data stored in the master disc in the form of the soft magnetic patterns to the magnetic recording medium initially demagnetized by the demagnetization means.

BRIEF DESCRIPTION OF THE DRAWINGS

The invention will be explained in detail hereinafter with reference to the accompanied drawing figures which illustrate the preferred embodiments of the invention, wherein:

FIG. 6(a) is a top plan view of a configuration of the recording head according to a fifth embodiment of the invention;

FIG. 6(b) is a cross-sectional view along B–B' of FIG. 6(a);

FIG. 6(c) is a characteristic diagram showing the magnetic field distribution on the recording head;

DETAILED DESCRIPTION OF THE PREFERRED EMBODIMENTS

The specific features of the invention will be summarized below with reference to certain preferred embodiments thereof.

Prior to performing transfer magnetization, initial magnetization of the magnetic recording layer of a magnetic recording disc 2 as a magnetic recording medium is performed by applying an alternating magnetic field (an AC magnetic field, the polarity of which changes sinusoidally with time) in the direction Y perpendicular to the recording surface of the magnetic recording layer, or in both the perpendicular direction Y and in the parallel direction X, and by gradually decreasing the intensity of the AC magnetic field. Thus, the entire magnetic recording layer is demagnetized prior to magnetic transfer (Hereafter, the above described method of demagnetization will be referred to as the "AC demagnetization method").

Figure 1A:
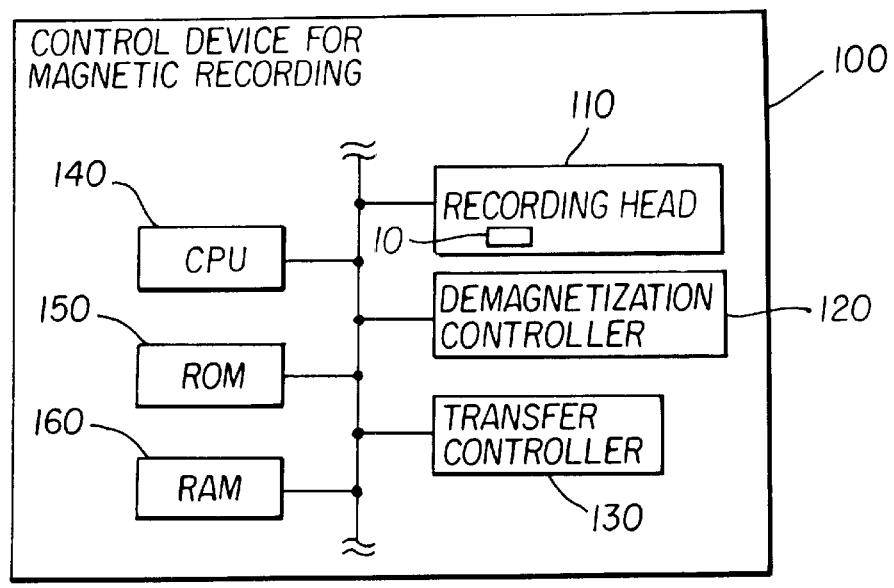
FIG. 1(a) is a block diagram of a control device for magnetic recording according to a first embodiment of the invention.
Figure 1B:
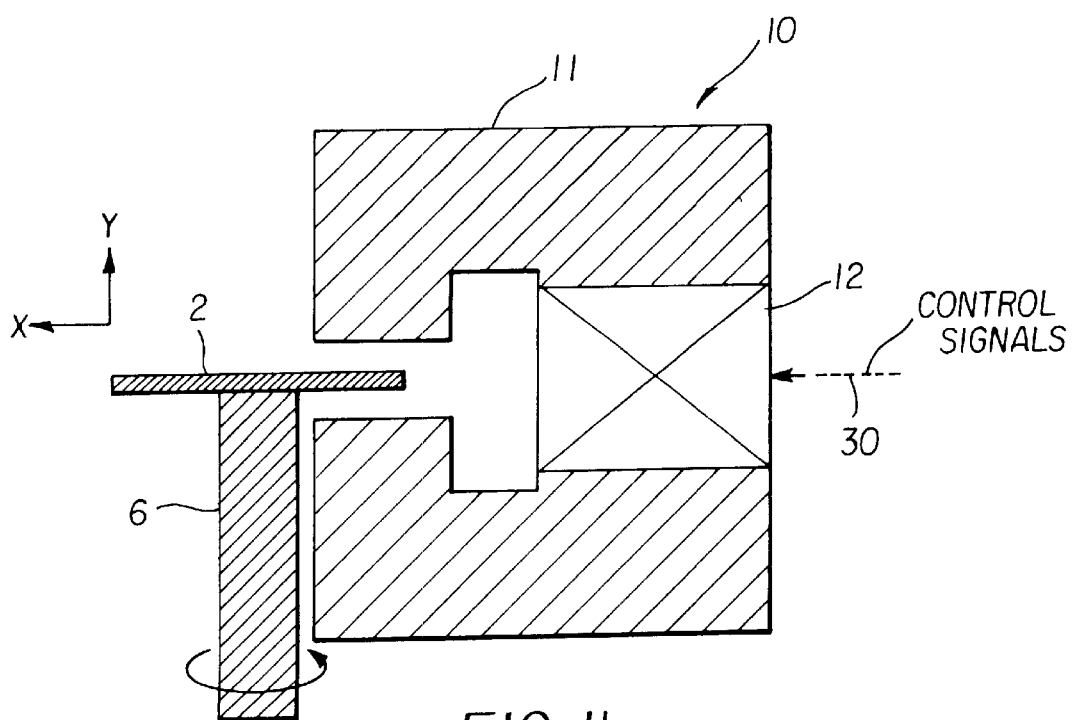
FIG. 1(b) is a cross-sectional view of the recording head of FIG. 1(a)
Figure 2:
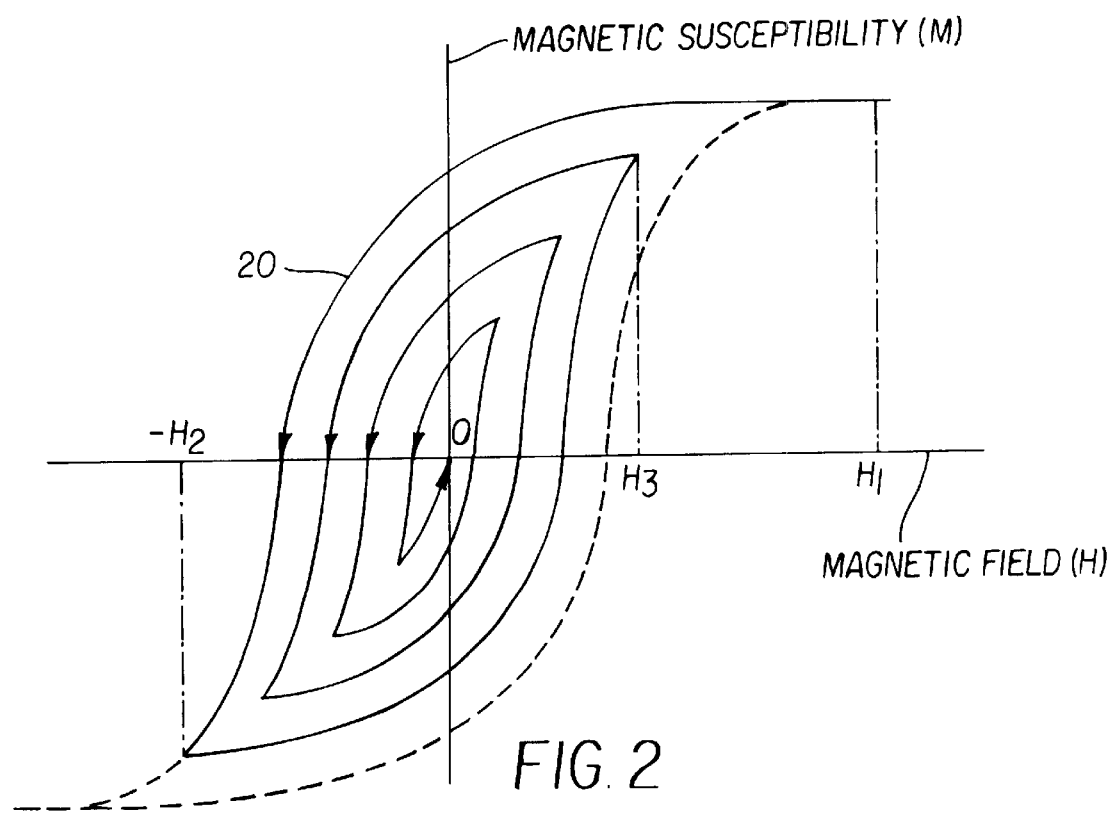
FIG. 2 is a characteristic diagram showing the M-H curve for explaining the method of initial magnetization in the control of magnetic recording according to the invention.

A first embodiment of the invention will now be explained with reference to FIG. 1(a) through FIG. 2. FIG. 1(a) shows the configuration of a control device for magnetic recording 100 according to a first embodiment of the invention which controls initial magnetization and transfer magnetization. FIG. 1(b) shows the configuration of a recording head 110 of FIG. 1(a).

The recording head 110 includes an electromagnet 10. The electromagnet 10, which includes a core 11 and a coil 12 as shown in FIG. 1(b), controls the initial magnetization and the transfer magnetization of a magnetic recording disc 2 (perpendicular magnetic recording medium) based on control signals 30.

The control device 100 includes a demagnetization controller 120, which controls the initial magnetization. The demagnetization controller 120 demagnetizes the entire magnetic recording layer by applying an AC magnetic field with changing polarity in the Y direction perpendicular to the recording surface of the magnetic recording layer of the magnetic recording disc 2, or in the perpendicular direction Y and the parallel direction X, and by gradually decreasing the intensity of the AC magnetic field with time.

Figure 18A:
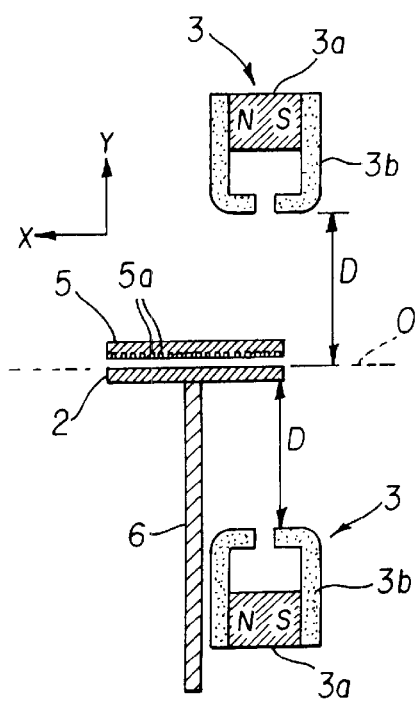
FIG. 18(a) is a cross-sectional view for explaining the process of transfer magnetization of a magnetic recording medium.
Figure 18B:
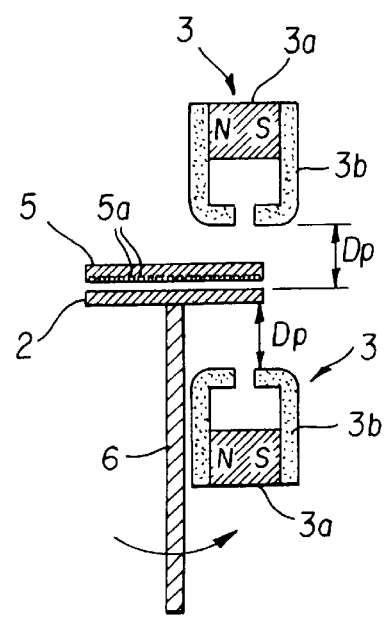
FIG. 18(b) is another cross-sectional view for explaining the process of transfer magnetization of a magnetic recording medium.
Figure 19A:
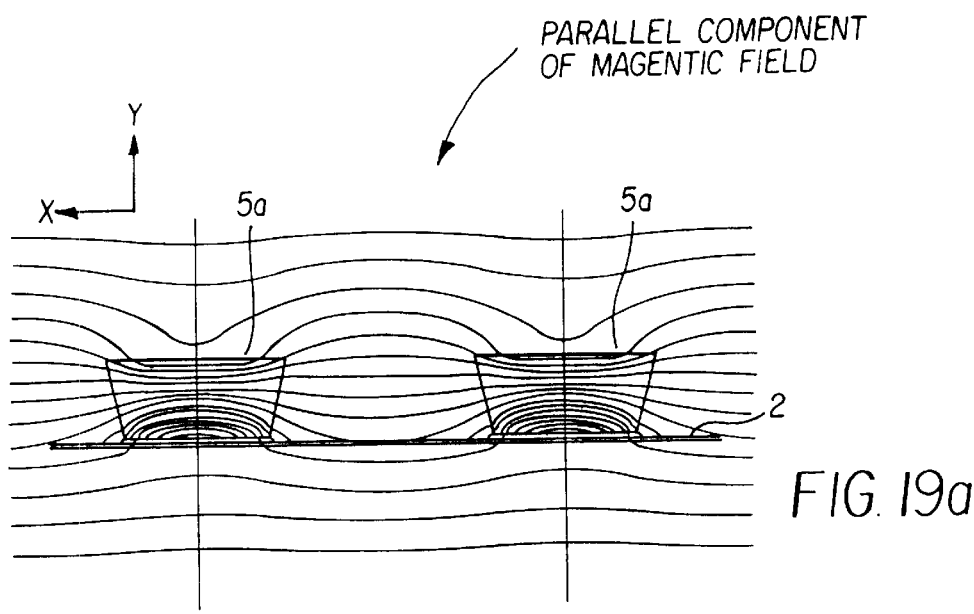
FIG. 19 is a characteristic diagram showing the distribution of the parallel component of a magnetic field.
Figure 19B:
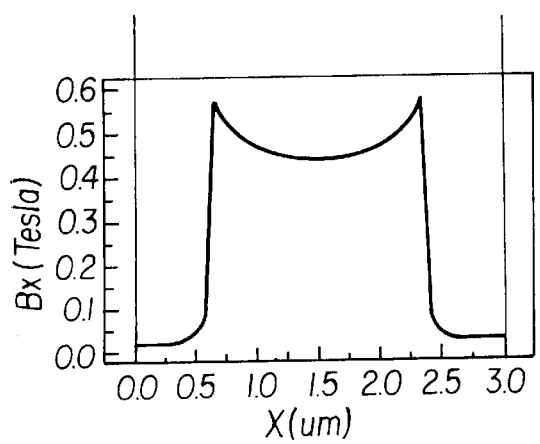
Figure 20A:
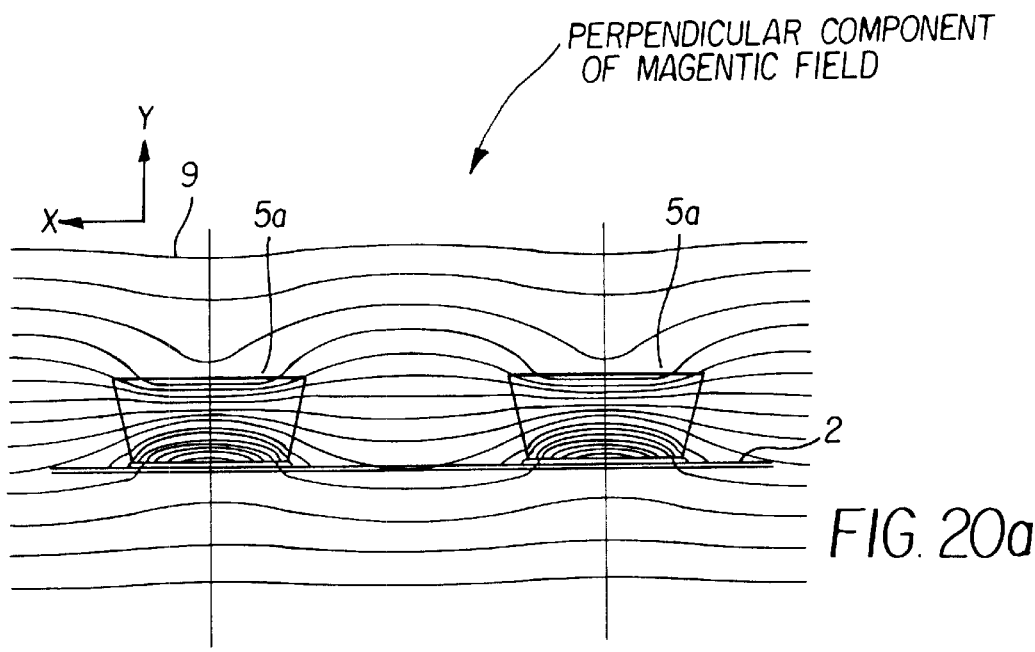
FIG. 20 is a characteristic diagram showing the distribution of the perpendicular component of the magnetic field.
Figure 20B:
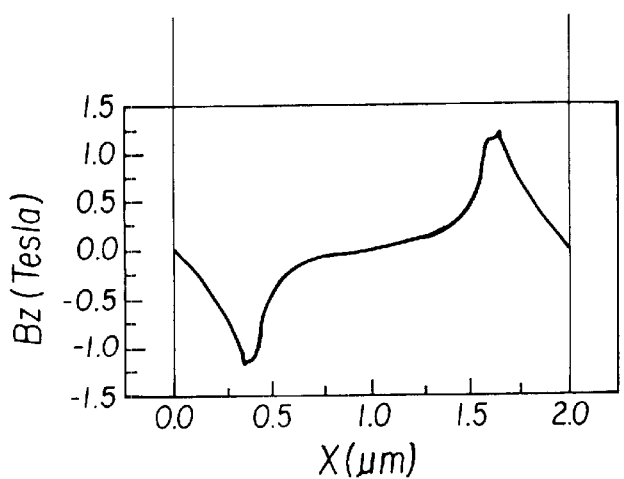

The control device 100 includes a transfer controller 130 which controls transfer magnetization. The transfer controller 130 applies a parallel magnetic field to the direction X parallel to the recording surface of the initialized magnetic recording disc 2 in close contact with or in close proximity to a master disc 5 (nonmagnetic substrate) to transfer the servo data stored in the form of soft magnetic patterns 5a in the master disc 5 to the magnetic recording layer of the magnetic recording disc 2. The master disc 5 includes a plurality of soft magnetic patterns 5a of a soft magnetic material which are embedded in the recording area, isolated from each other, and aligned periodically. The master disc 5 has the same construction as described earlier with reference to FIGS. 18(a) and 18(b).

A CPU 140 controls the entire control device 100. A ROM 150 stores various control programs according to the invention and programs for operation control. A RAM 160 is used as a temporary storage area for storing various data and as a working area for computation.

The magnetic recording disc 2 used as a magnetic recording medium according to the invention is the so-called perpendicular magnetic recording medium having an easy axis of magnetization in the direction Y perpendicular to the surface of the recording medium which is the recording surface (that is, the recorded magnetization orients along the Y axis perpendicular to the surface of the recording medium). The magnetic recording disc 2 is inserted into the gap of the core 11 of the recording head 110 as shown in FIG. 1(b). The magnetic recording disc 2 is fixed to a spindle stage 6 rotatably in the direction indicated by an arrow in FIG. 1(b). The magnetic recording disc 2 can be used as a recording medium of, for example, a hard disk drive (hereafter referred to as a "HDD") which is used in these days as a peripheral storage device of most computers, and which uses a magnetic film as a storage means.

Figure 17A:
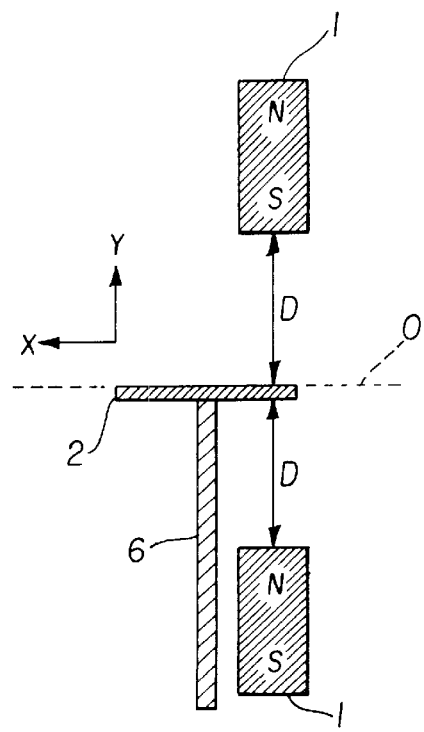
FIG. 17(a) is a cross-sectional view for explaining the process of initial magnetization of a magnetic recording disc.
Figure 17B:
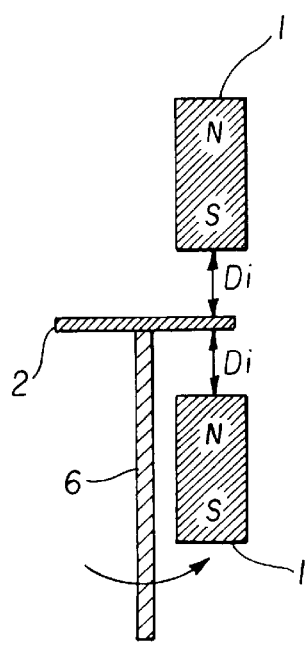
FIG. 17(b) is another cross-sectional view for explaining the process of initial magnetization of the magnetic recording disc.

Initial magnetization and the transfer magnetization according to the invention will now be explained. In initial magnetization, an AC magnetic field, the polarity of which changes with time in the direction Y perpendicular to the recording surface of the magnetic recording layer of the magnetic recording disc 2 (or, in both the perpendicular direction Y and the parallel direction X), is generated prior to the transfer process by driving the electromagnet 10 in a controlled manner based on the control signals 30 outputted from the demagnetization controller 120 as shown in FIG. 1(b). In the initial magnetization process as described with reference to FIGS. 17(a) and 17(b), the conventional method which magnetizes the magnetic recording disc 2 in one direction (the DC demagnetization method) is replaced by the AC demagnetization method according to the invention.

The AC demagnetization method will now be explained in detail with reference to FIG. 2. First, the magnetization is saturated by applying a large magnetic field $H_1$ to the magnetic recording disc 2, as shown by an M-H curve in FIG. 2. Next, the magnetic field $H_1$ is reduced gradually until it becomes a magnetic field $-H_2$ ($|H_2|<|H_1|$) in the opposite direction, and then the magnetic field $-H_2$ is increased to $H_3$ ($|H_3|<|H_2|$). By alternately repeating the increase and the decrease many times, the magnitude of the magnetic susceptibility M is converged eventually to zero along the M-H hysteresis curve 20.

In FIG. 1(b), the magnetic recording disc 2, fixed to the spindle stage 6, is inserted to the central portion of the gap of the core 11 formed of a U-shape soft magnetic stuff. A leakage magnetic field is applied from the gap to the magnetic recording disc 2, fixed to the spindle stage 6 and inserted to the gap while rotating the spindle stage 6 (at 3000 rpm). The magnitude of the applied magnetic field is raised up to 5000 Oe, and then decreased while varying with time as expressed by the following Eq. (1).

$$H(t)=A_0 \cdot g(t) \cdot \cos(2\pi f t) \qquad (1)$$

Here, t is the time, $A_0$ is the maximum applied magnetic field, which is 5000 Oe, and f is the frequency, which is 50 Hz. The function g(t) is a function which decreases with time at a certain rate from 1 (linearly), and reaches zero after several seconds.

After performing the initial magnetization described above (that is, controlled demagnetization), the transfer magnetization described below is performed. The transfer magnetization can be performed by a procedure similar to the process described earlier with reference to FIGS. 18(*a*) and 18(*b*). That is, a parallel magnetic field is applied in the X direction parallel to the recording surface of the magnetic recording disc 2 in close contact with or in close proximity to the master disc 5, and the servo data stored in the form of soft magnetic patterns 5*a* in the master disc 5 is magnetically transferred to the magnetic recording layer of the magnetic recording disc 2. In other words, in the transfer magnetization, the control device for magnetic recording 100 writes the servo data for positioning the magnetic head for writing and reading data to the recording surface of the magnetic recording disc 2, which has been subjected to initial magnetization.

Figure 21:
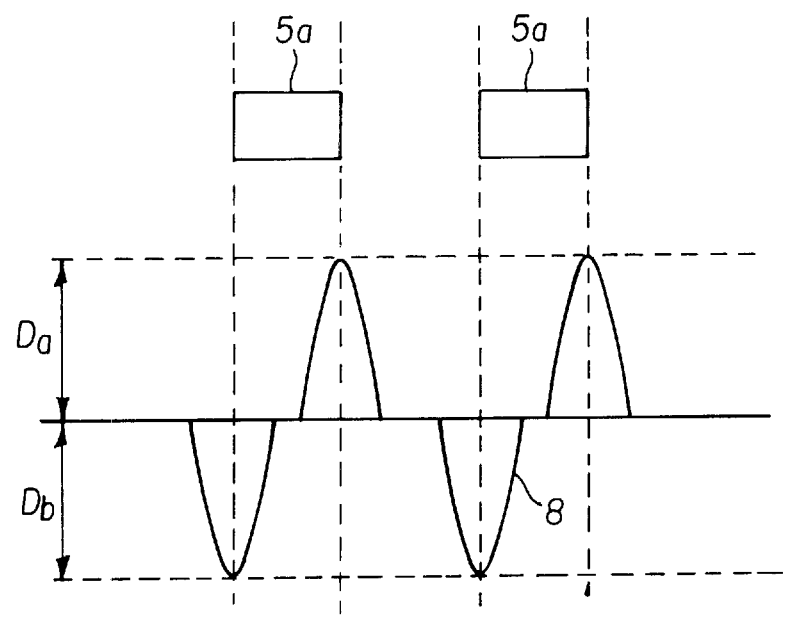
FIG. 21 is an explanatory drawing showing the waveform of a transferred signal read out after performing only the transfer magnetization shown in FIG. 18; and, FIG. 22 is an explanatory drawing showing a transferred signal transferred to a magnetic recording medium, first subjected to the initial magnetization in the perpendicular direction thereof shown in FIG. 17, and then to the transfer magnetization as shown in FIG. 18.
Figure 22:
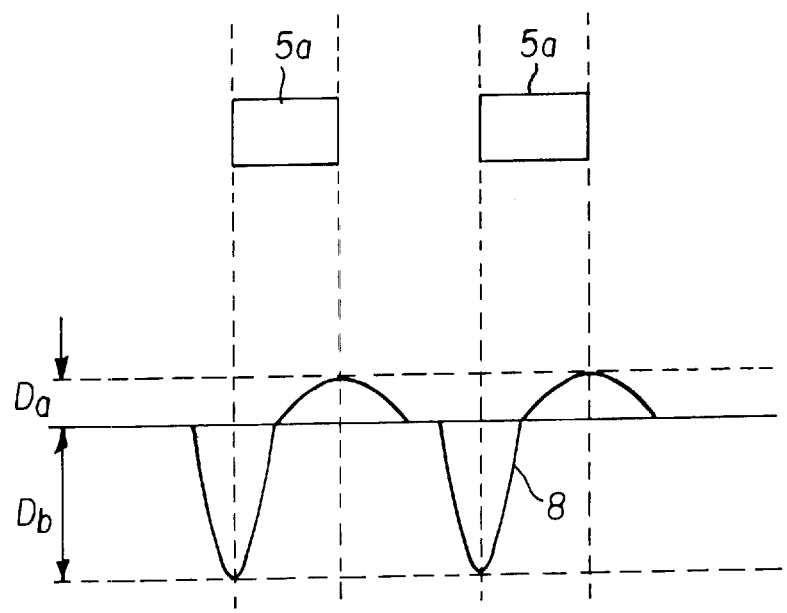

By controlling the initial magnetization and the transfer magnetization, a symmetrical transferred signal waveform, with the magnitude Da and Db thereof equalized as described earlier with reference to FIG. 21, is obtained with excellent reproducibility.

Figure 3:
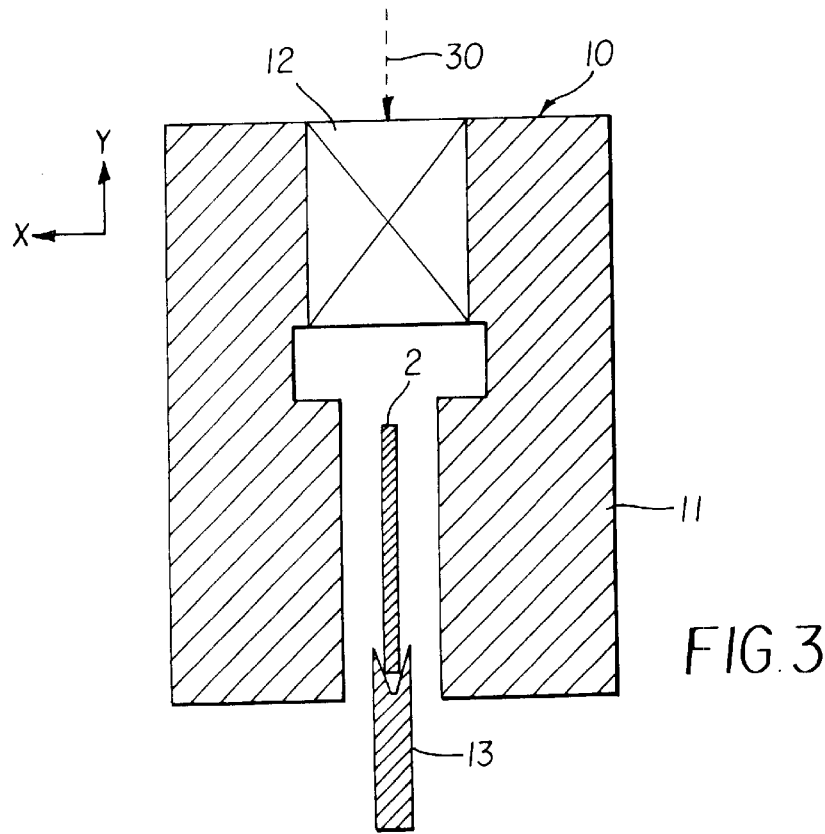
FIG. 3 is a cross-sectional view showing a configuration of a recording head according to a second embodiment of the invention including an electromagnet.

Initial magnetization according to a second embodiment of the invention is explained with reference to FIG. 3. FIG. 3 is a cross-sectional view showing a configuration of a recording head according to the second embodiment of the invention including an electromagnet. The shape of the electromagnet 10 is the same as in FIG. 1(*b*), but the magnetic recording disc 2 is placed vertically in this modified configuration. A holder 13 holds the magnetic recording disc 2. This arrangement facilitates reducing the dimensions in the width direction.

Figure 4A:
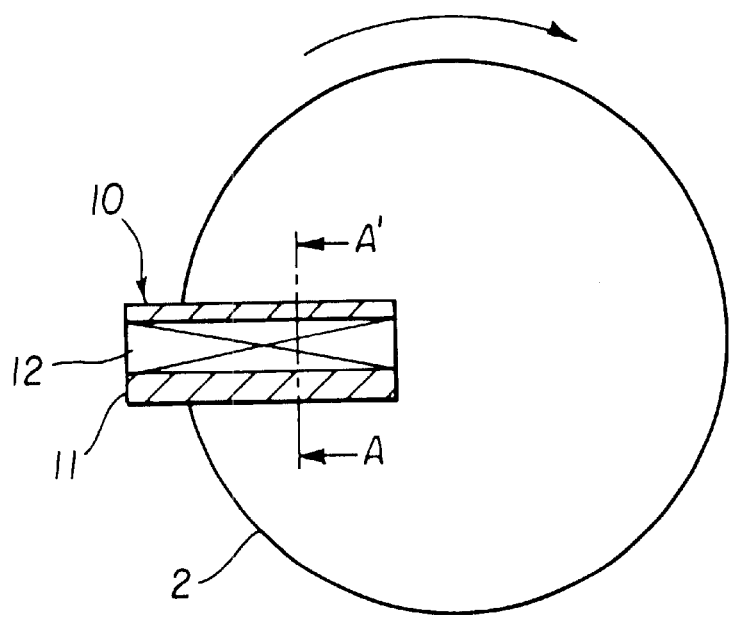
FIG. 4(a) is a top plan view showing a configuration of the recording head according to a third embodiment of the invention including an electromagnet.
Figure 4B:
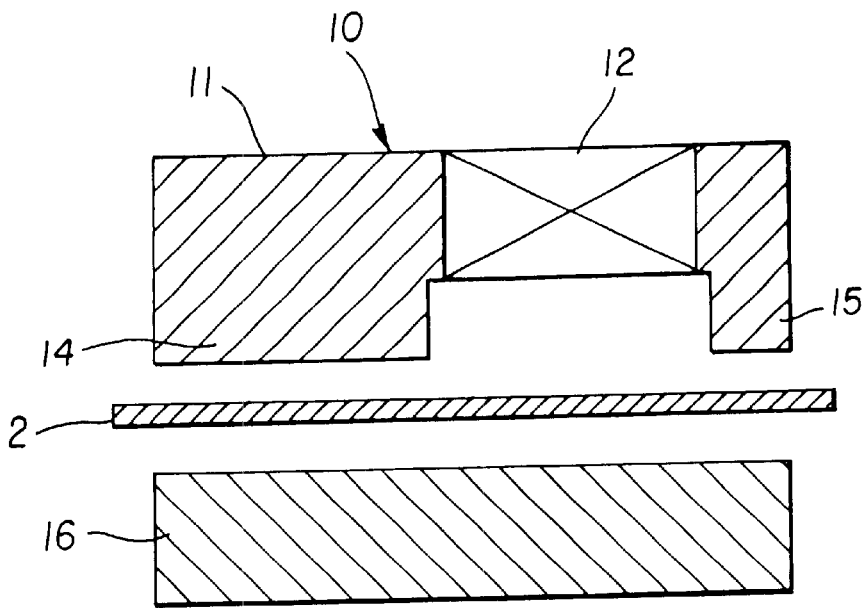
FIG. 4(b) is a cross-sectional view along A–A' of FIG. 4(a)

Initial magnetization according to a third embodiment of the invention is explained with reference to FIGS. 4(*a*) and 4(*b*). FIGS. 4(*a*) and 4(*b*) schematically describe an arrangement in which the magnetic recording disc 2 is not surrounded by a core 11 formed of a U-shape soft magnetic stuff, but is between the core 11 and a back pole 16 formed of a soft magnetic stuff. FIG. 4(*a*) is a top plan view of the electromagnet 10 for AC demagnetization, and FIG. 4(*b*) is a cross-section along the line segment A–A' of FIG. 4(*a*). In such a configuration, the magnetic field leaking from the core 11 formed of a U-shape soft magnetic stuff circulates through the back pole 16 with high permeability. Since the end face 14 of the core 11 is tens of times broader than the end face 15 of the core 11, the leakage magnetic field from the end face 14 is weaker in intensity than the leakage field from the end face 15. Since the weak leakage magnetic field from the end face 14 does not contribute to the initial magnetization, the AC demagnetization is performed by the leakage magnetic field from the end face 15.

Figure 5A:
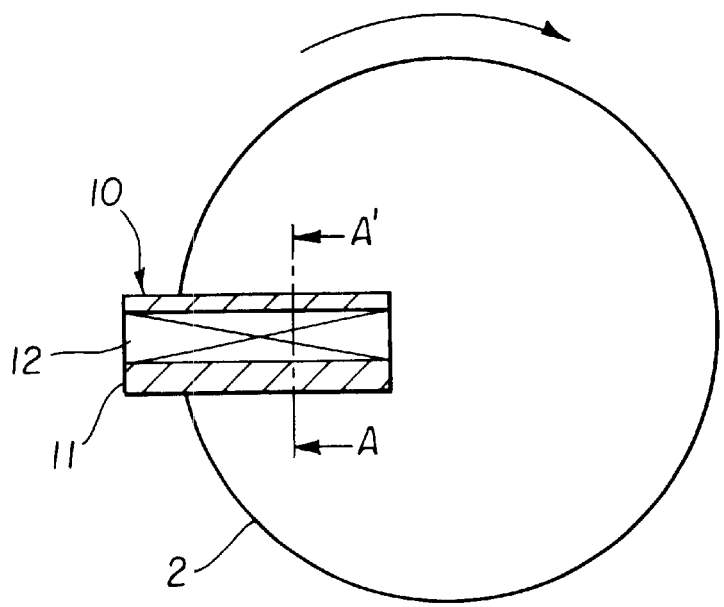
FIG. 5(a) is a top plan view showing a configuration of the recording head according to a fourth embodiment of the invention including an electromagnet.
Figure 5B:
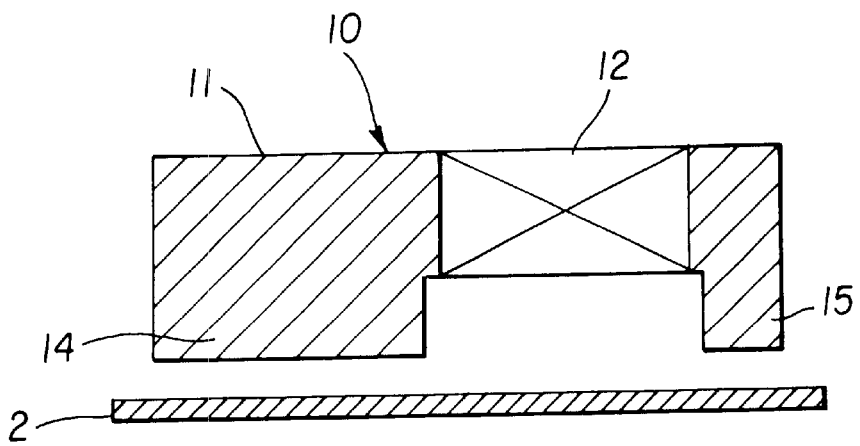
FIG. 5(b) is a cross-sectional view along A–A' of FIG. 5(a)

Initial magnetization according to a fourth embodiment of the invention is explained with reference to FIGS. 5(*a*) and 5(*b*). FIGS. 5(*a*) and 5(*b*) schematically describe a configuration which omits the back pole of FIG. 4(*b*). Such a configuration also facilitates controlling the AC demagnetization similarly as the foregoing embodiments.

In the initial magnetization according to the embodiments described with reference to FIG. 3 through FIG. 5(*b*), the AC magnetic field applied to the magnetic recording disc 2 changes with time in the same manner as described with reference to FIG. 1(*b*).

A fifth embodiment of the invention will now be explained with reference to FIGS. 6(*a*) through 6(*c*). Throughout these figures, the same reference numerals as used for describing the foregoing embodiments are used to designate the same constituent elements and their explanations are omitted for the sake of simplicity. According to the fifth embodiment, the electromagnet 10 of the recording head 110 in the control device for magnetic recording 100 is changed to a permanent magnet. FIG. 6(*a*) is a top plan view of the recording head 110. FIG. 6(*b*) is a cross-sectional view along B–B' of FIG. 6(*a*). FIG. 6(*c*) shows the distribution of the applied magnetic field. The recording head 110 includes a magnetic head 17 including a plurality of mutually separated single-pole heads 18 (permanent magnets) embedded in a nonmagnetic substrate 19. The single-pole heads 18 are arranged such that the S poles and the N poles of the adjacent magnets are reversed. Two such magnetic heads 17 are positioned above and below the magnetic recording disc 2, and are controlled to move in the perpendicular direction Y by the demagnetization controller 120.

The initial magnetization according to the fifth embodiment of the invention will now be explained. To perform initial magnetization, the magnetic heads 17 are moved in the Y direction perpendicular to the recording surface of the magnetic recording disc 2 based on the control by the demagnetization controller 120, which changes the distance D between the disc surface and the magnetic heads, such that an AC magnetic field like that shown in FIG. 6(*c*) is applied to the magnetic recording disc 2. The AC magnetic field at the surface of the magnetic recording disc 2, positioned at the central portion of the gap between the two magnet heads 17, has a distribution which does not change with time, but the polarity of the AC magnetic field changes spatially as shown in FIG. 6(*c*). Since the parallel components of the magnetic field mutually cancel at the central portion of the gap between the two magnet heads 17 in this configuration, only the perpendicular component of the magnetic field exhibits a distribution. In such an arrangement as described above, an AC magnetic field which gradually decreases as expressed by the foregoing equation (1) is applied by rotating the magnetic recording disc 2 (at 3000 rpm). To gradually decrease the AC magnetic field, the distance D between the magnetic heads and the recording medium is gradually increased; that is, the magnetic heads are gradually withdrawn from the recording medium. The distance D is from 2 mm to 80 mm.

Figure 7A:
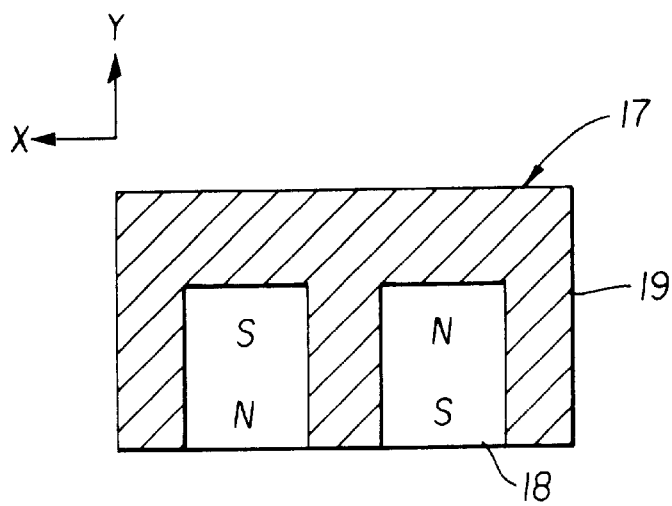
FIG. 7(a) is a cross-sectional view showing the configuration of a recording head according to a sixth embodiment of the invention.
Figure 7B:
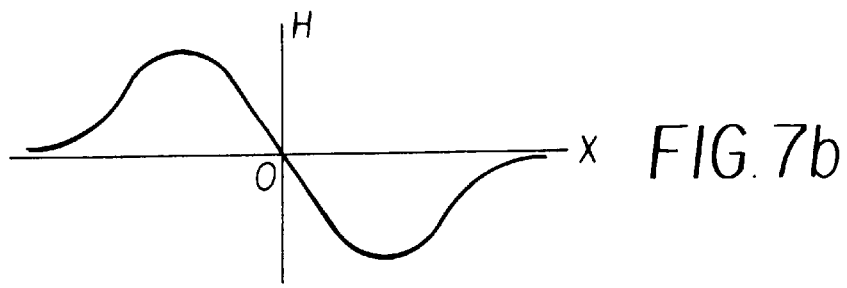
FIG. 7(b) is a characteristic diagram showing the distribution of the perpendicular component of the magnetic field generated by the recording head of FIG. 7(a)
Figure 7C:
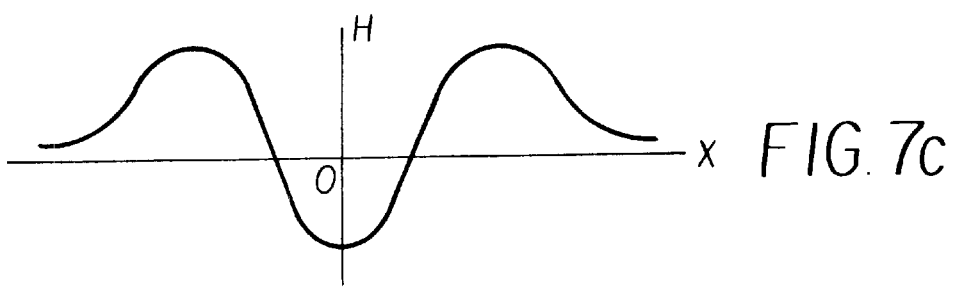
FIG. 7(c) is a characteristic diagram showing the distribution of the parallel component of the magnetic field generated by the recording head of FIG. 7(a)

Initial magnetization according to a sixth embodiment of the invention is explained with reference to FIGS. 7(*a*) through 7(*c*). FIG. 7(*a*) shows a configuration which positions permanent magnets on only one side of the recording medium. FIG. 7(*b*) and FIG. 7(*c*) show the spatial distribution of the magnetic field applied to the magnetic recording disc 2. When the magnetic heads are positioned symmetrically on both sides of the recording medium as described earlier, the parallel components of the magnetic field at the surface of the recording medium cancel each other. However, when a magnetic field is applied from the magnetic heads 17 on only one side to the surface of the recording medium, a parallel component is included. FIG. 7(b) shows the perpendicular component of the magnetic field, and FIG. 7(c) shows the parallel component of the magnetic field. In such an arrangement, both the parallel and perpendicular magnetization components of the magnetic recording disc 2 are demagnetized by the AC demagnetization method.

Figure 8:
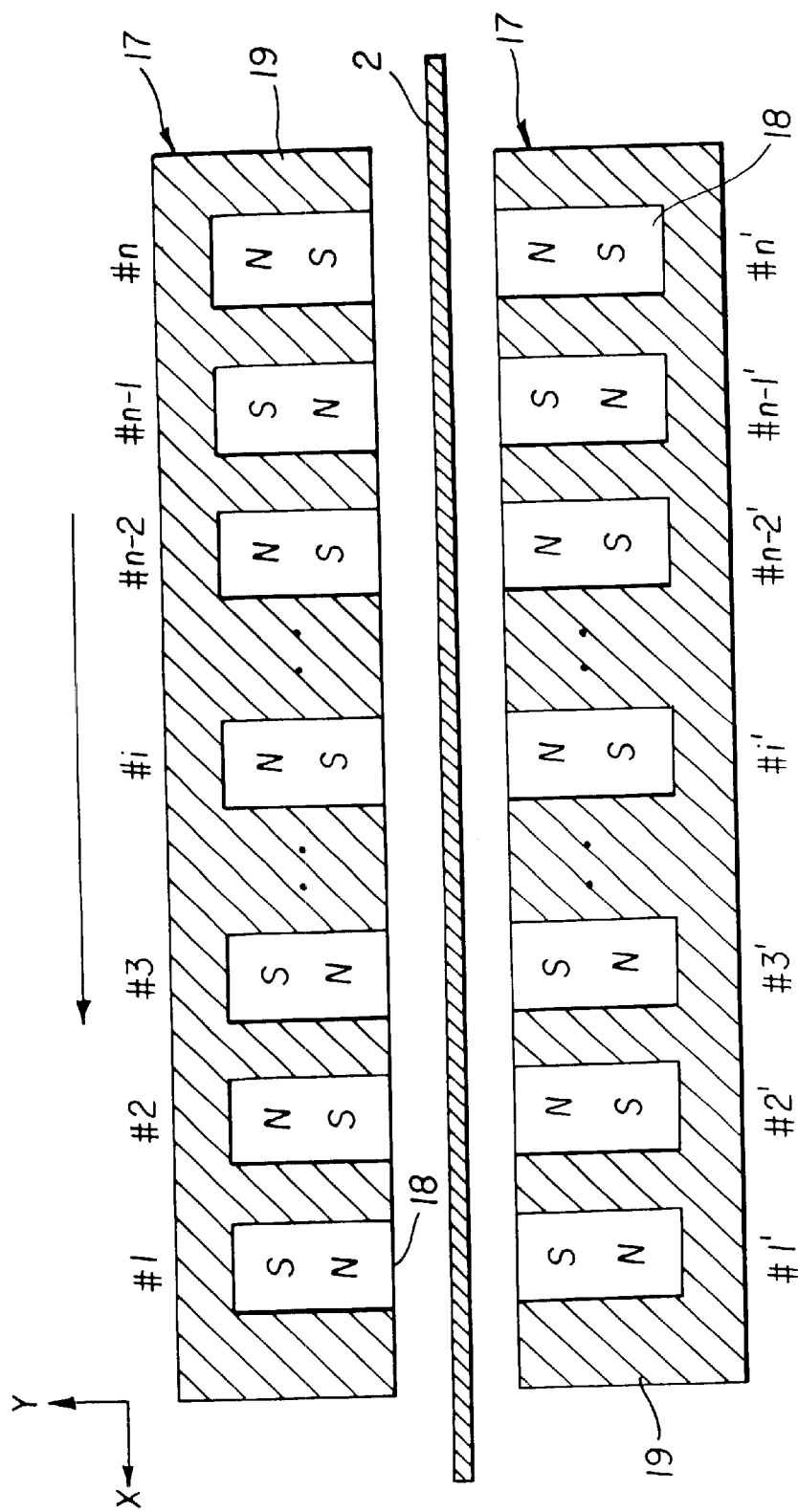
FIG. 8 is a cross-sectional view showing a configuration according to a seventh embodiment of the invention arranging recording heads including permanent magnets above and below a magnetic recording medium.

Initial magnetization according to a seventh embodiment of the invention is explained with reference to FIG. 8. FIG. 8 shows an arrangement favorable for developing the demagnetization described above using permanent magnets. The number of permanent magnets in the magnetic head 17 is increased from two to n magnets. Here, the number n (where the magnets are labeled #1, . . . , #n on the upper side, and #1', . . . , #n' on the lower side) may be an odd number such as 3 or 5, or may be an even number such as 4 or 6. By positioning the magnetic heads 17 with such a construction symmetrically above and below the magnetic recording disc 2, an AC magnetic field having a distribution similar to that described in FIG. 6(c) is generated.

Figure 9:
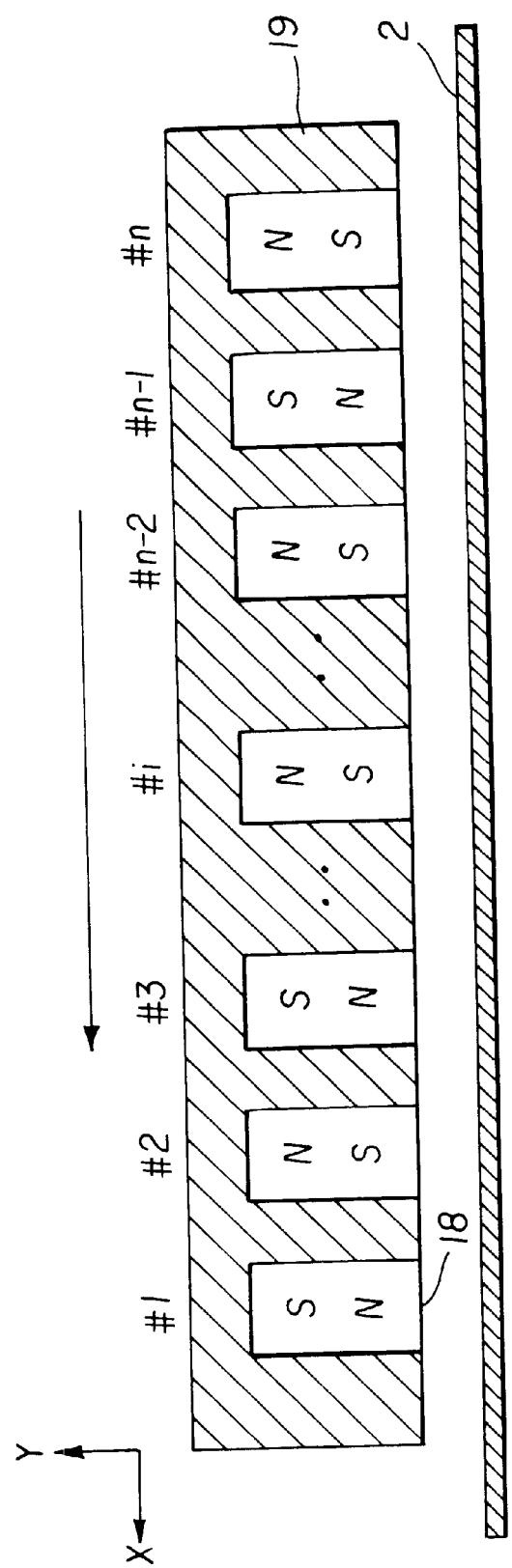
FIG. 9 is a cross-sectional view showing a configuration according to an eighth embodiment of the invention arranging a recording head including permanent magnets on one side of a magnetic recording medium.

Initial magnetization according to an eighth embodiment of the invention is explained with reference to FIG. 9. FIG. 9 shows a configuration developed from the sixth and seventh embodiments described above. The interior of the magnetic head 17 has a construction similar to that according to the seventh embodiment shown in FIG. 8. The magnetic head 17 is positioned on only one side of the recording medium, similarly to the sixth embodiment described with reference to FIG. 7(a). This configuration facilitates generating an AC magnetic field having a distribution similar to that shown in FIG. 7(b) and FIG. 7(c).

Figure 10B:
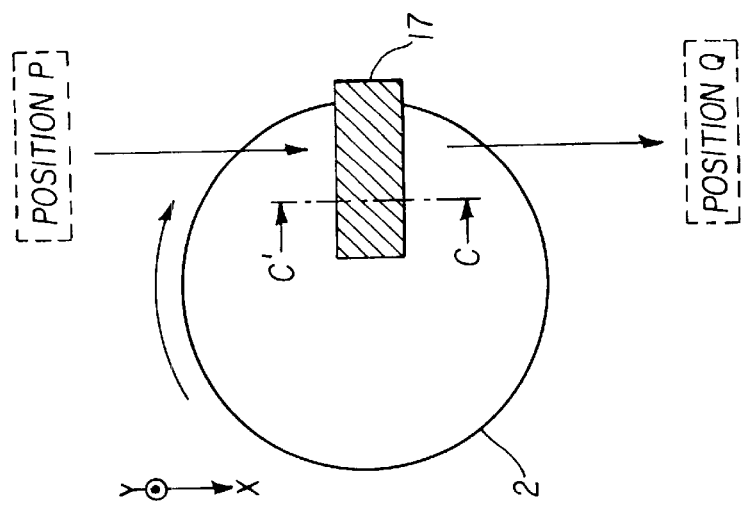
FIG. 10(b) is a top plan view of the configuration of FIG. 10(a)
Figure 10A:
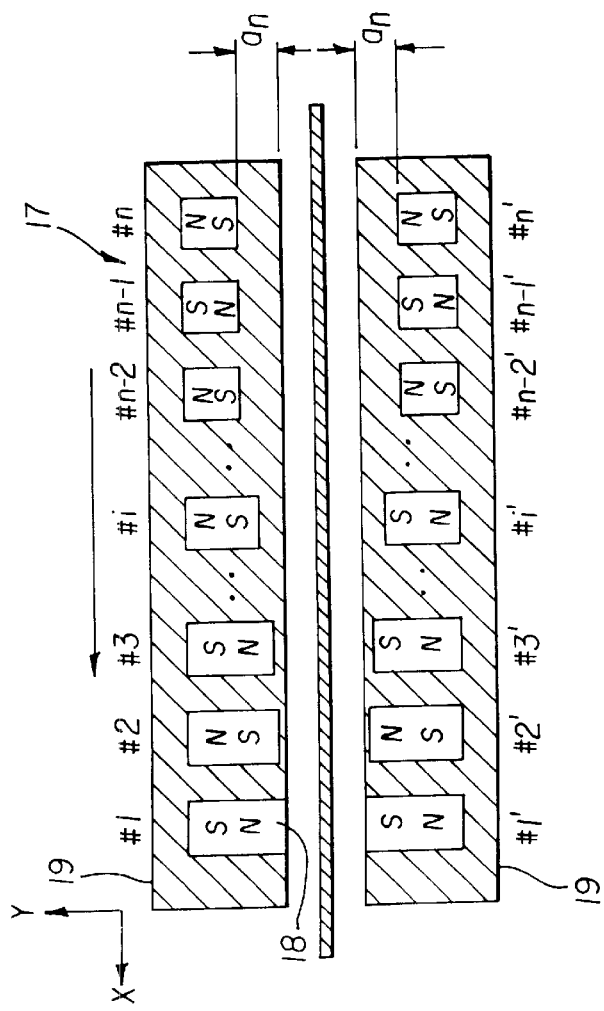
FIG. 10(a) is a cross-sectional view of a configuration of the recording head according to a ninth embodiment of the invention arranging recording heads including permanent magnets above and below a magnetic recording medium.

A ninth embodiment of the invention will now be explained with reference to FIGS. 10(a) and 10(b). The same reference numerals as used in the above described embodiments are used to designate the same constituent elements and their explanations are omitted for the sake of simplicity. The AC demagnetization method according to the fifth embodiment using permanent magnets gradually increases the distance D from the surface of the magnetic recording disc 2 to the permanent magnets (the distance in the direction Y perpendicular to the recording medium) to gradually decrease the magnitude of the applied magnetic field. According to the ninth embodiment, the distance D from the surface of the recording medium to the permanent magnets is held constant in FIGS. 10(a) and 10(b). An AC magnetic field for performing AC demagnetization is generated by moving the magnetic recording disc 2 in a traversing direction (the parallel direction X). FIG. 10(a) is a cross-section along the line segment C–C' of FIG. 10(b).

The initial magnetization according to the ninth embodiment of the invention will now be explained. In FIG. 10(a), n pieces of magnets, from the magnet #1 to the magnet #n, are embedded in the magnetic head 17. The magnet #1 is embedded such that its end face coincides with the surface of the magnetic head 17, but the second magnet #2 through the nth magnet #n are embedded such that the distance a, from the head surface to the end face of the magnet buried increases at a constant rate. At the nth magnet #n at which $a_i$ is maximum, $a_n$ is set equal to 5 cm. By thus increasing $a_i$ at a constant rate, the spatial distribution of the magnetic field created at the surface of the recording medium by the magnetic head 17 becomes artificially equivalent to the aforementioned equation (1). Here, x represents the position on the magnet head 17, and λ represents the wavelength, which coincides with the distance from the magnet #k to the magnet #(k+2). In FIG. 10(b), the demagnetization magnetic head 17, which surrounds the rotating (at 3000 rpm) magnetic recording disc 2, performs AC demagnetization during moving from the position P to the position Q. By thus moving the magnetic head 17, which generates such a spatial distribution of the magnetic field, from the position P to the position Q, an AC magnetic field which artificially changes with time as represented by the equation (1) is applied to the magnetic recording disc 2.

Figure 11:
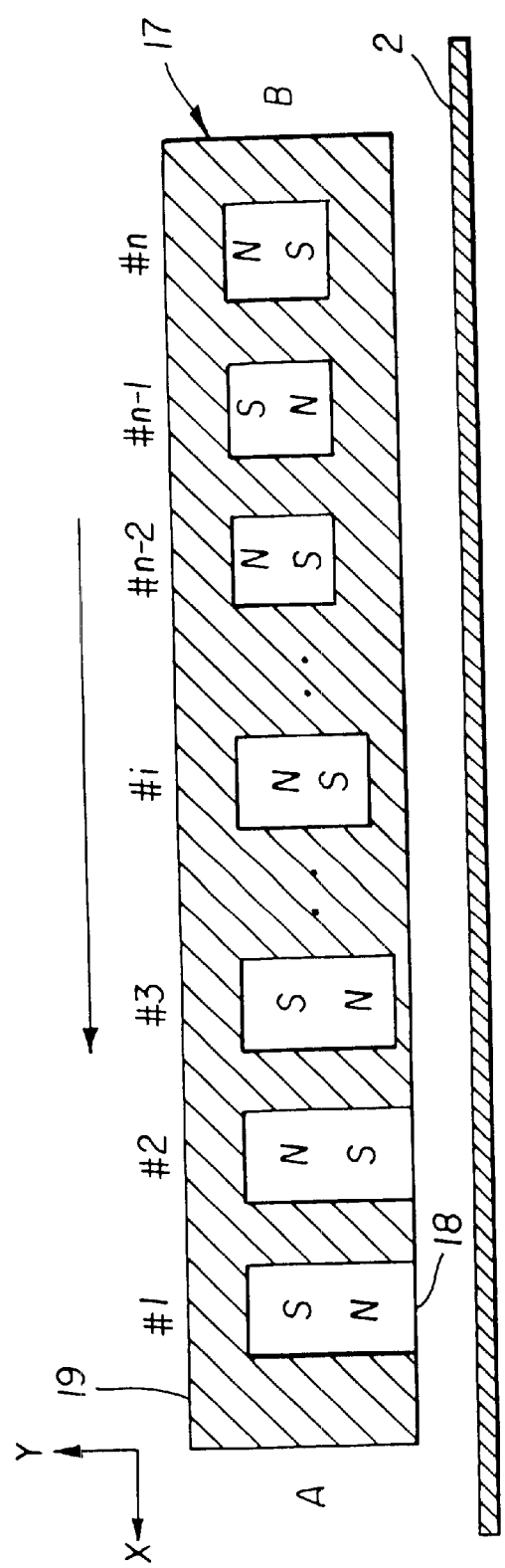
FIG. 11 is a cross-sectional view showing a configuration according to a tenth embodiment of the invention arranging a recording head including permanent magnets on one side of a magnetic recording medium.

Initial magnetization according to a tenth embodiment of the invention will now be explained with reference to FIG. 11. In FIG. 11, a magnetic head 17, in which are embedded the aforementioned magnets (#1 through #n) at different embedded positions, is positioned on only one side of the magnetic recording disc 2. This configuration facilitates generating an AC magnetic field having a distribution similar to that described in FIG. 7(b) and FIG. 7(c).

Figure 12B:
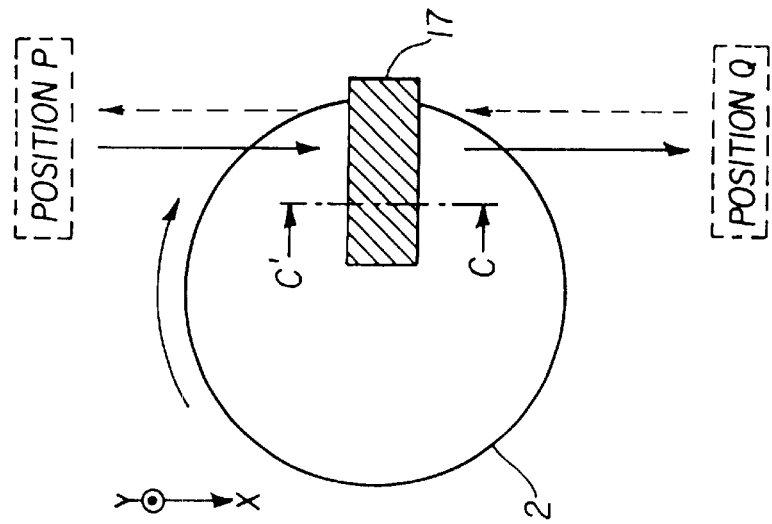
FIG. 12(b) is a top plan view of the configuration of FIG. 12(a)
Figure 12A:
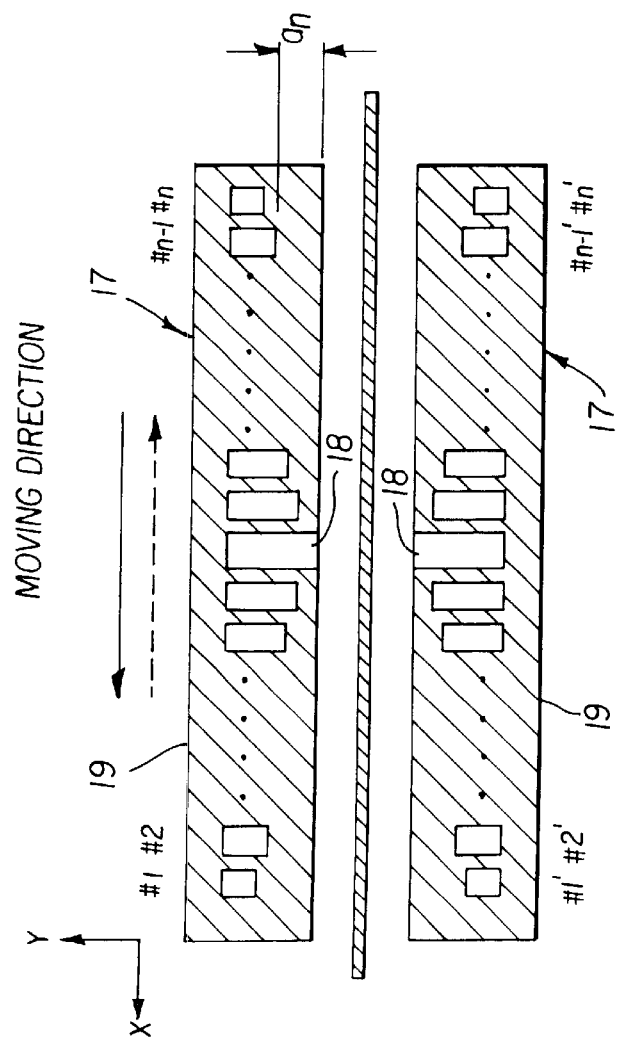
FIG. 12(a) is a cross-sectional view of a configuration according to an eleventh embodiment of the invention arranging recording heads including permanent magnets above and below a magnetic recording medium.

Initial magnetization according to an eleventh embodiment of the invention is explained with reference to FIGS. 12(a) and 12(b). According to the eleventh embodiment, the depths a, in the magnetic head 17 do not increase monotonically from the magnet #1 to the magnet #n. Instead, the depth decreases gradually from the magnet #1, reaches zero at the magnet in the center position of the magnetic head 17, and then increases gradually from the center position, again reaching the maximum at the magnet #n. By arranging the magnet head 17 as described above, stable AC demagnetization is performed not only over the path from position P to position Q (in the direction approaching the recording medium), but also over the return path (in the direction receding from the recording medium). The above described configuration facilitates applying an AC magnetic field having a distribution similar to that described in FIG. 6(c).

Figure 13:
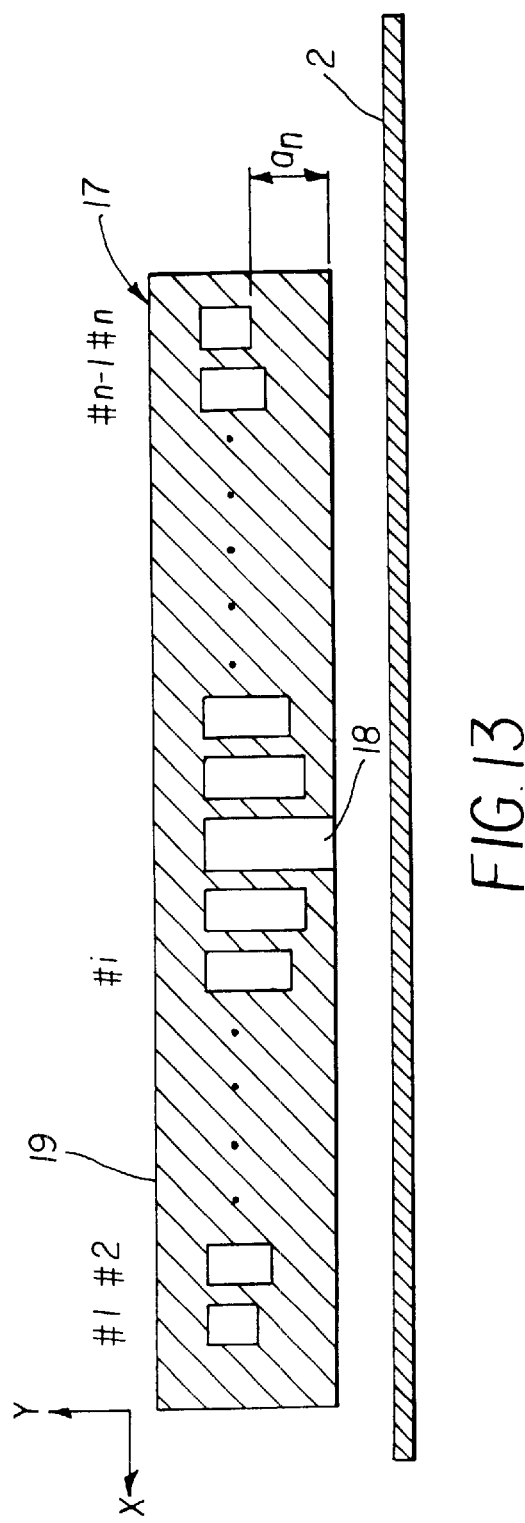
FIG. 13 is a cross-sectional view of a configuration according to a twelfth embodiment of the invention arranging the recording head including permanent magnets of FIG. 12 on one side of a magnetic recording medium.

Initial magnetization according to a twelfth embodiment of the invention will now be explained with reference to FIG. 13. A magnetic head 17, having a construction similar to the magnetic head described with reference to FIG. 12(a), is placed on only one side of the recording medium. This configuration facilitates generating an AC magnetic field having a distribution similar to that described in FIG. 7(b) and FIG. 7(c).

Figure 14A:
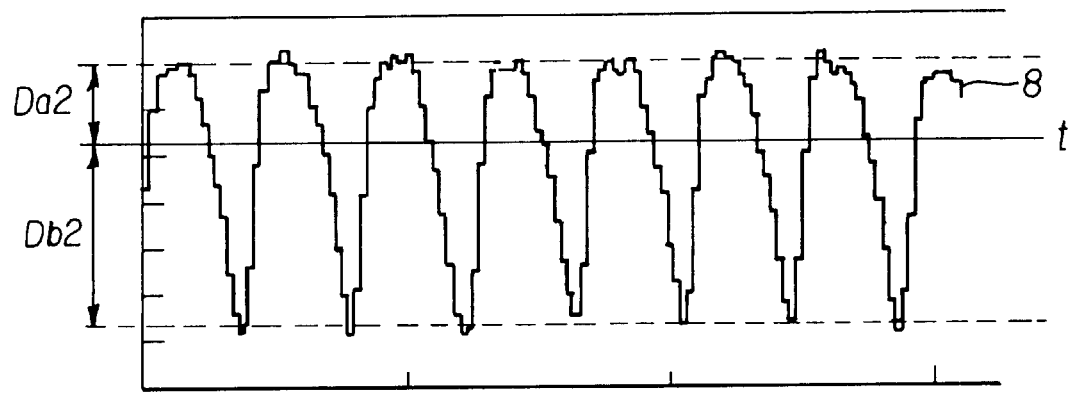
FIG. 14(a) is a diagram showing a transferred signal waveform according to the prior art.
Figure 14B:
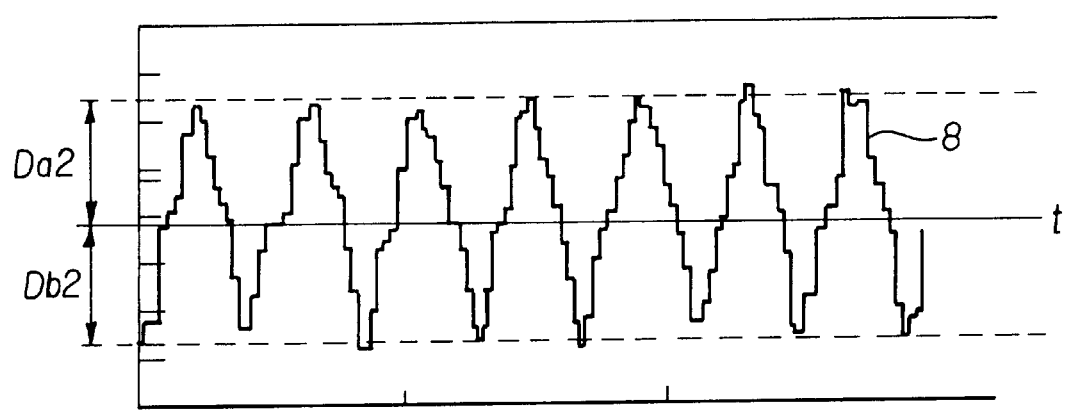
FIG. 14(b) is a diagram showing a transferred signal waveform according to the invention.
Figure 15A:
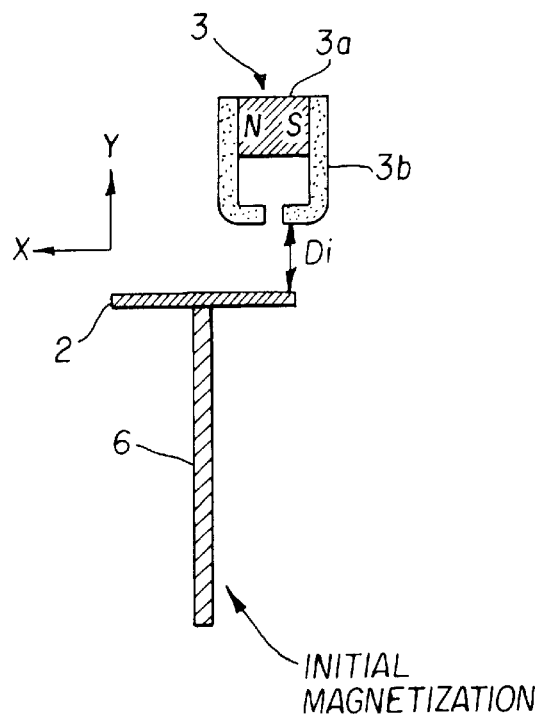
FIG. 15(a) is a cross-sectional view for explaining the initial magnetization of a longitudinal magnetic recording medium.
Figure 15B:
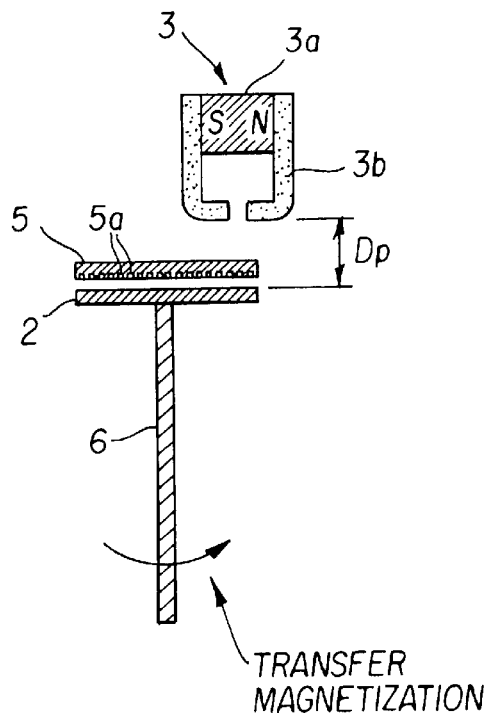
FIG. 15(b) is another cross-sectional view for explaining the transfer magnetization of the longitudinal magnetic recording medium.
Figure 16A:
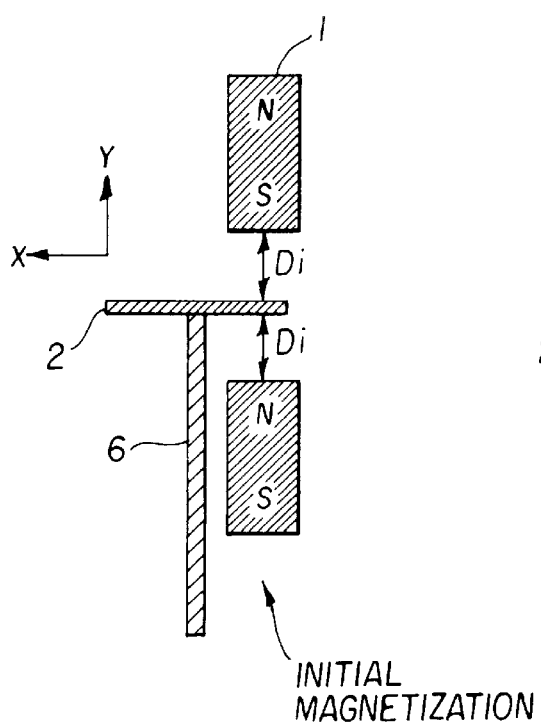
FIG. 16(a) is a cross-sectional view for explaining the initial magnetization of a perpendicular magnetic recording medium.
Figure 16B:
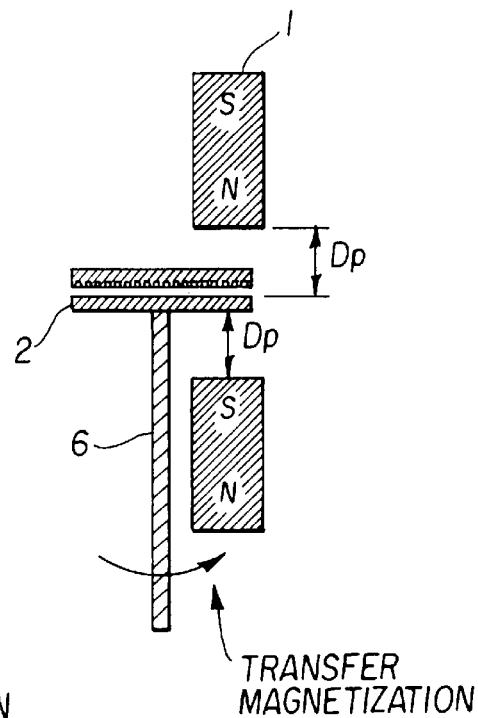
FIG. 16(b) is another cross-sectional view for explaining the transfer magnetization of the perpendicular magnetic recording medium.

Now the waveform of the signal transferred according to the invention and the waveform of the signal transferred according to the prior art are compared with each other with reference to FIGS. 14(a) and 14(b). FIG. 14(a) is the waveform of the signal 8 transferred to the magnetic recording medium, initialized by the conventional initial magnetization described with reference to FIGS. 17(a) and 17(b), by the transfer magnetization described with reference to FIGS. 18(a) and 18(b). Here the transferred signal intensities are such that Da<Db, and the signal waveform is asymmetric. On the other hand, FIG. 14(b) is the waveform of the signal 8 transferred to the magnetic recording medium, initialized by the AC demagnetization configuration which uses the magnetic head 17 on one side of the magnetic recording medium as shown in FIG. 7(a), by the transfer method described with reference to FIGS. 18(a) and 18(b). Here the transferred signal intensities Da and Db are nearly equal, and a symmetrical waveform is obtained.

The result of the above described comparison indicates that a transferred signal 8 with a symmetrical waveform is obtained and recording is performed with high reliability according to the invention.

According to the invention, an AC magnetic field with changing polarity is applied in the perpendicular direction or in the perpendicular direction and the parallel direction with respect to the recording surface of the magnetic recording layer of the magnetic recording medium for performing initial magnetization prior to performing transfer magnetization, and the intensity of the AC magnetic field is gradually reduced with time to demagnetize the entire magnetic recording layer. Consequently, a symmetrical transferred signal waveform with peaks of equal magnitude is obtained with good reproducibility in subsequent transfer magnetization, the magnetic transfer is performed with high reliability, and the throughput of manufacturing magnetic recording media is improved.

What is claimed is:

1. A method of controlling magnetic recording in a magnetic recording medium, the method comprising the steps of:

demagnetizing the magnetic recording medium by applying an alternating magnetic field; where the polarity thereof changes perpendicular to or both perpendicular and parallel to a recording surface of said magnetic recording layer; and decreasing the intensity of said alternating magnetic field with elapse of time to demagnetize the magnetic recording layer.

2. The method according to claim 1, wherein said demagnetizing step employs an electromagnet generating said alternating magnetic field, the polarity thereof changing with elapse of time in a predetermined position, to demagnetize the magnetic recording layer.

3. The method according to claim 1, wherein said demagnetizing step employs a magnetic head comprising a plurality of mutually separated permanent magnets embedded in nonmagnetic base, said magnetic head generating an alternating magnetic field, said alternating magnetic field being constant in time; and the polarity of said alternating magnetic field changing spatially; to demagnetize the magnetic recording layer.

4. The method according to claim 3, wherein said alternating magnetic field is generated by moving said magnetic head perpendicular to said recording surface of said magnetic recording medium.

5. The method according to claim 3, wherein said alternating magnetic field is generated by moving said magnetic head in a direction which traverses said magnetic recording medium, while the distance between said magnetic head and said recording surface of said magnetic recording medium is held constant.

6. The method according to claim 1, wherein said magnetic recording medium is a perpendicular magnetic medium having an easy axis of magnetization in the direction perpendicular to said recording surface.

7. The method according to claim 1, wherein the direction of the magnetization recorded in said magnetic recording medium is perpendicular to said recording surface.

8. The method according to claim 1, wherein the magnitude of said applied alternating magnetic field first saturates the magnetic recording medium, and then decreases with the polarity thereof changing sinusoidally with time as described by the following equation, $$H(t) = A_0 \cdot g(t) \cdot \cos(2\pi f \cdot t),$$

wherein t is the time, $A_0$ is the maximum applied magnetic field, f is the frequency, and g(t) is a function that decreases linearly from 1 to 0 over a predetermined period.

9. The method according to claim 1, further comprising transferring magnetization to the magnetic recording medium after said demagnetizing step by the steps of:

preparing a master disc including a nonmagnetic substrate and soft magnetic layers of a soft magnetic material embedded in said nonmagnetic substrate such that said soft magnetic layers are isolated from each other and aligned periodically;

positioning said master disc in close contact with or in close proximity to said recording surface of said magnetic recording layer of said magnetic recording medium; and applying a magnetic field parallel to said recording surface in close contact with or in close proximity to said master disc to magnetically transferring the servo data stored in said master disc in the form of said soft magnetic patterns to said magnetic recording medium.

10. A control device for magnetic recording comprising:

a demagnetization means; and a transfer means;

wherein said demagnetization means applies an alternating magnetic field perpendicular to or perpendicular and parallel to the recording surface of the magnetic recording layer of a magnetic recording medium, the intensity of said alternating magnetic field decreasing with elapse of time, to initially demagnetize a magnetic recording layer, and wherein said magnetic transfer means positions a master disc in close contact with or in close proximity to said recording surface of said magnetic recording layer, said master disc comprising a nonmagnetic substrate and a plurality of soft magnetic layers of a soft magnetic material embedded in said nonmagnetic substrate such that said soft magnetic layers are isolated from each other and aligned periodically; and wherein said magnetic transfer means applies a magnetic field in parallel to said recording surface of said magnetic recording layer, to magnetically transfer the servo data stored in said master disc in the form of said soft magnetic patterns to said magnetic recording medium initially demagnetized by said demagnetization means.

* * * * *